US011506542B2

(12) United States Patent
Cadima

(10) Patent No.: US 11,506,542 B2
(45) Date of Patent: Nov. 22, 2022

(54) COOKTOP APPLIANCE WITH A WIRED TEMPERATURE SENSOR

(71) Applicant: Haier US Appliance Solutions, Inc., Wilmington, DE (US)

(72) Inventor: Paul Bryan Cadima, Crestwood, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 319 days.

(21) Appl. No.: 16/780,962

(22) Filed: Feb. 4, 2020

(65) Prior Publication Data
US 2021/0239538 A1 Aug. 5, 2021

(51) Int. Cl.
*G01K 1/14* (2021.01)
*F23D 14/72* (2006.01)
*F24C 3/00* (2006.01)
*G01K 1/08* (2021.01)

(52) U.S. Cl.
CPC .............. *G01K 1/14* (2013.01); *F23D 14/72* (2013.01); *F24C 3/008* (2013.01); *G01K 1/08* (2013.01); *F23D 2900/14* (2013.01)

(58) Field of Classification Search
USPC ........................................ 374/208, 141, 163
See application file for complete search history.

(56) References Cited

U.S. PATENT DOCUMENTS

| 3,100,995 | A | 8/1963 | Woodward |
| 4,770,545 | A | 9/1988 | Takada et al. |
| 6,138,554 | A | 10/2000 | McFadden et al. |
| 2017/0205076 | A1* | 7/2017 | Cadima ................... F24C 3/126 |
| 2018/0142897 | A1 | 5/2018 | Cadima |
| 2018/0340691 | A1 | 11/2018 | Cadima |
| 2020/0077838 | A1* | 3/2020 | Paller ..................... G01K 13/00 |
| 2020/0182477 | A1* | 6/2020 | Bentley ................ F24C 15/107 |
| 2021/0095853 | A1* | 4/2021 | Cadima ................... F24C 3/126 |
| 2021/0100393 | A1* | 4/2021 | Bentley ................... F24C 3/126 |
| 2021/0148575 | A1* | 5/2021 | Cadima ................... F24C 3/027 |
| 2021/0172607 | A1* | 6/2021 | Cadima ................... F24C 3/082 |
| 2021/0285649 | A1* | 9/2021 | Billman ................. F24C 3/126 |
| 2021/0404666 | A1* | 12/2021 | Cadima ................ F24C 15/107 |
| 2021/0404885 | A1* | 12/2021 | Cadima ................... F24C 15/08 |

FOREIGN PATENT DOCUMENTS

| CN | 207936129 U | 10/2018 |
| EP | 1764559 B1 | 3/2013 |
| JP | H1163506 A | 3/1999 |
| JP | 3691462 B2 | 9/2005 |
| JP | 2011075261 A | 4/2011 |
| KR | 101670799 B1 | 11/2016 |
| KR | 101802776 B1 | 12/2017 |

OTHER PUBLICATIONS

Translation of KR101670799B1 (Year: 2016).*
Translation of JP 2011075261A (Year: 2011).*

* cited by examiner

Primary Examiner — Mirellys Jagan
(74) Attorney, Agent, or Firm — Dority & Manning, P.A.

(57) ABSTRACT

A gas burner assembly includes a gas burner. A grate with a plurality of fingers is positioned above the gas burner. The plurality of fingers includes a sensor finger. A temperature sensor is mounted to the sensor finger of the plurality of fingers of the grate at a first end portion of the sensor finger. The temperature sensor is thermally isolated from the grate.

18 Claims, 18 Drawing Sheets

COOKTOP APPLIANCE WITH A WIRED TEMPERATURE SENSOR

FIELD OF THE INVENTION

The present subject matter relates generally to gas burners for cooktop appliances.

BACKGROUND OF THE INVENTION

Gas cooktop appliances generally include a plurality of gas burners mounted at a top surface of the appliance. Gas burners heat a cooking utensil positioned on a grate over the gas burner primarily via convective heating. Thus, measuring cooking utensil temperatures on gas cooktop appliances poses challenges because any sensor that contacts the cooking utensil is significantly heated by swirling heated air from the gas burner.

Some gas cooktops include a sensor that passes through the gas burner and presses against the cooking utensil on the grate. Such sensors have drawbacks. For example, assembly and cleaning of burner parts is greatly complicated due to the construction of the gas burner that includes a sensor passing through the gas burner. As another example, openings in the gas burner and other cooktop components that accommodate the sensors can undesirably pass spills through the gas burner.

BRIEF DESCRIPTION OF THE INVENTION

Aspects and advantages of the invention will be set forth in part in the following description, or may be apparent from the description, or may be learned through practice of the invention.

In an example embodiment, a gas burner assembly includes a gas burner. A grate with a plurality of fingers is positioned above the gas burner. The plurality of fingers includes a sensor finger. A temperature sensor is mounted to the sensor finger of the plurality of fingers of the grate at a first end portion of the sensor finger. The temperature sensor is thermally isolated from the grate.

In another example embodiment, a cooktop appliance includes a top panel. A gas burner is positioned on the top panel. A grate is also positioned on the top panel. The grate has a plurality of fingers positioned above the gas burner. The plurality of fingers includes a sensor finger. A temperature sensor is mounted to the sensor finger of the plurality of fingers of the grate at a first end portion of the sensor finger. The temperature sensor is thermally isolated from the grate.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
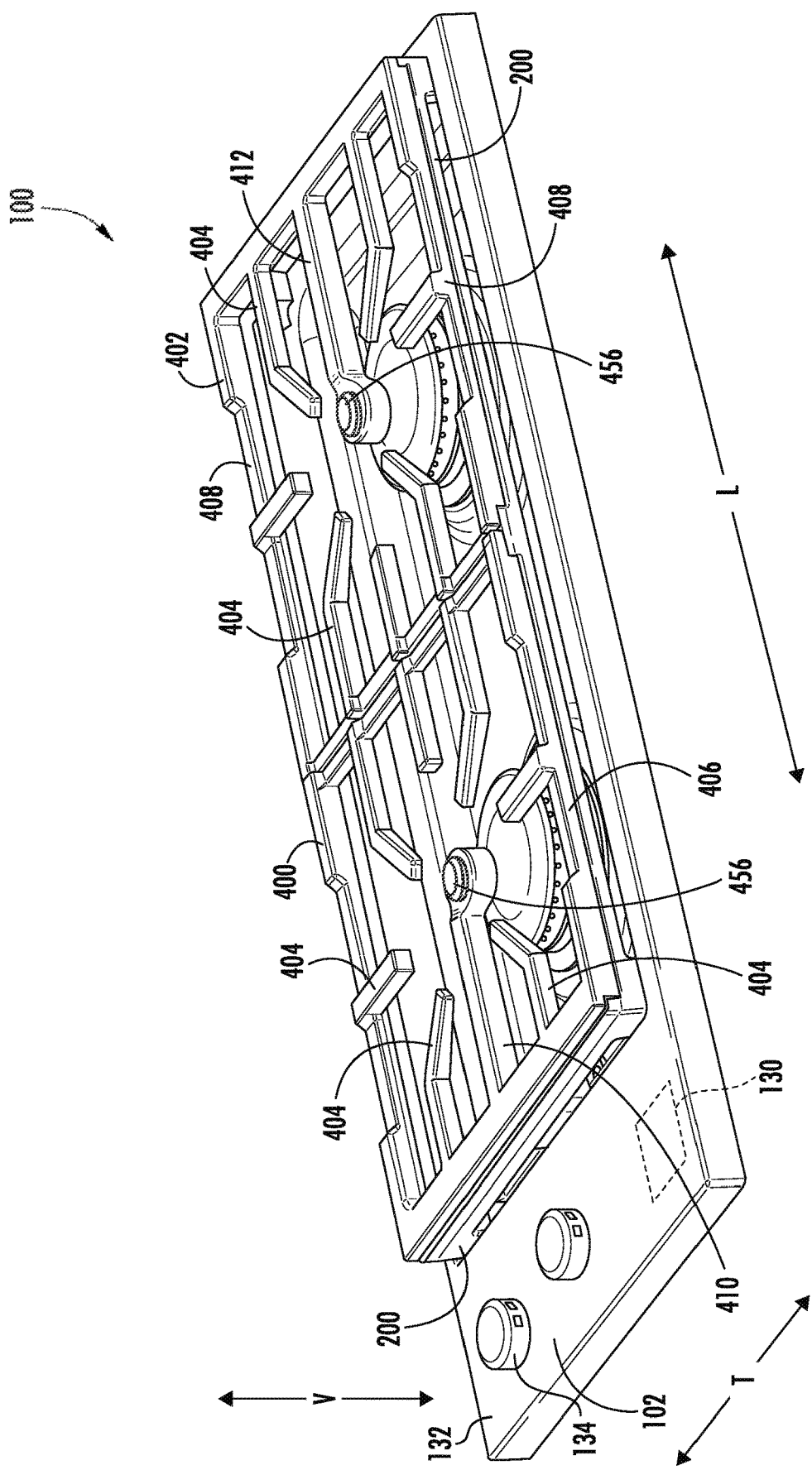
FIG. 1 provides a perspective view of a cooktop appliance according to one or more example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Figure 2:
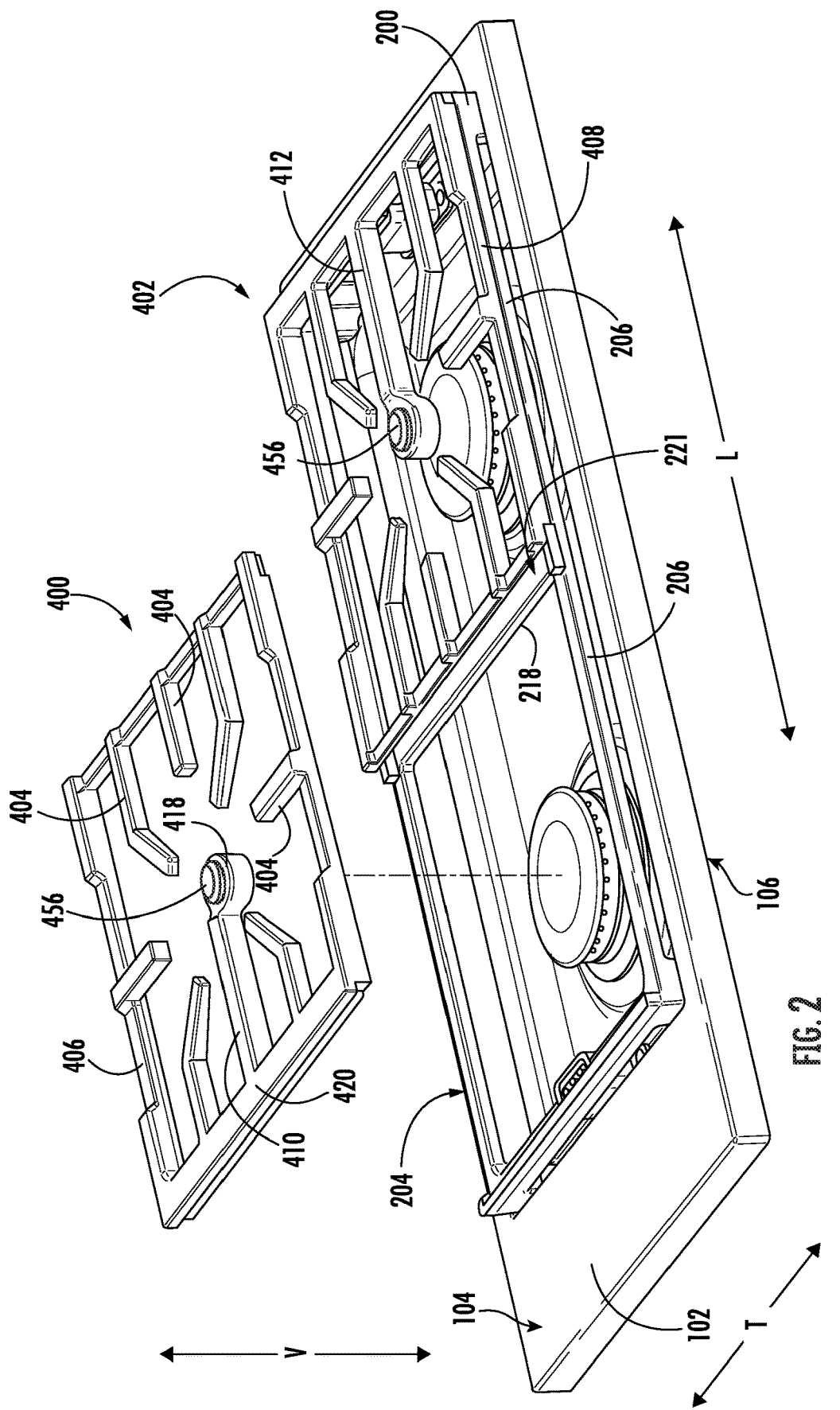
FIG. 2 provides a partially exploded view of the example cooktop appliance of FIG. 1.
Figure 3:
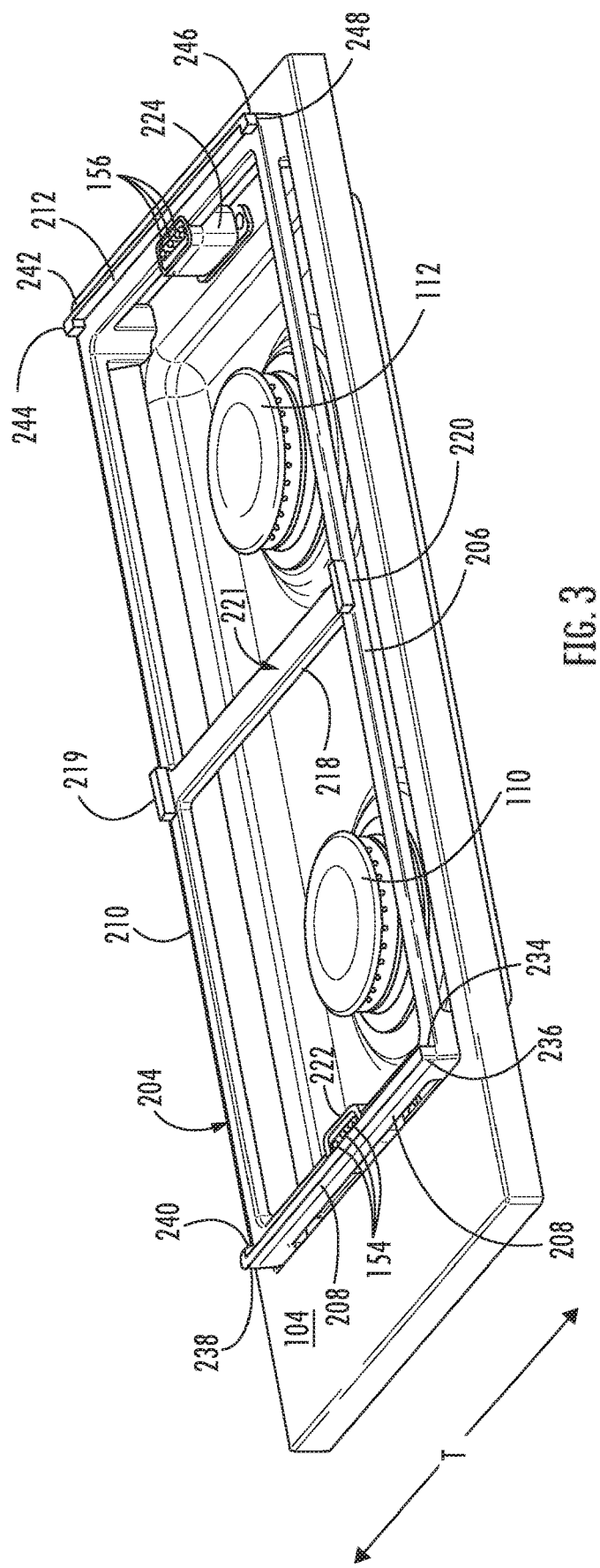
FIG. 3 provides a perspective view of the example cooktop appliance of FIG. 1 with the grates removed.
Figure 4:
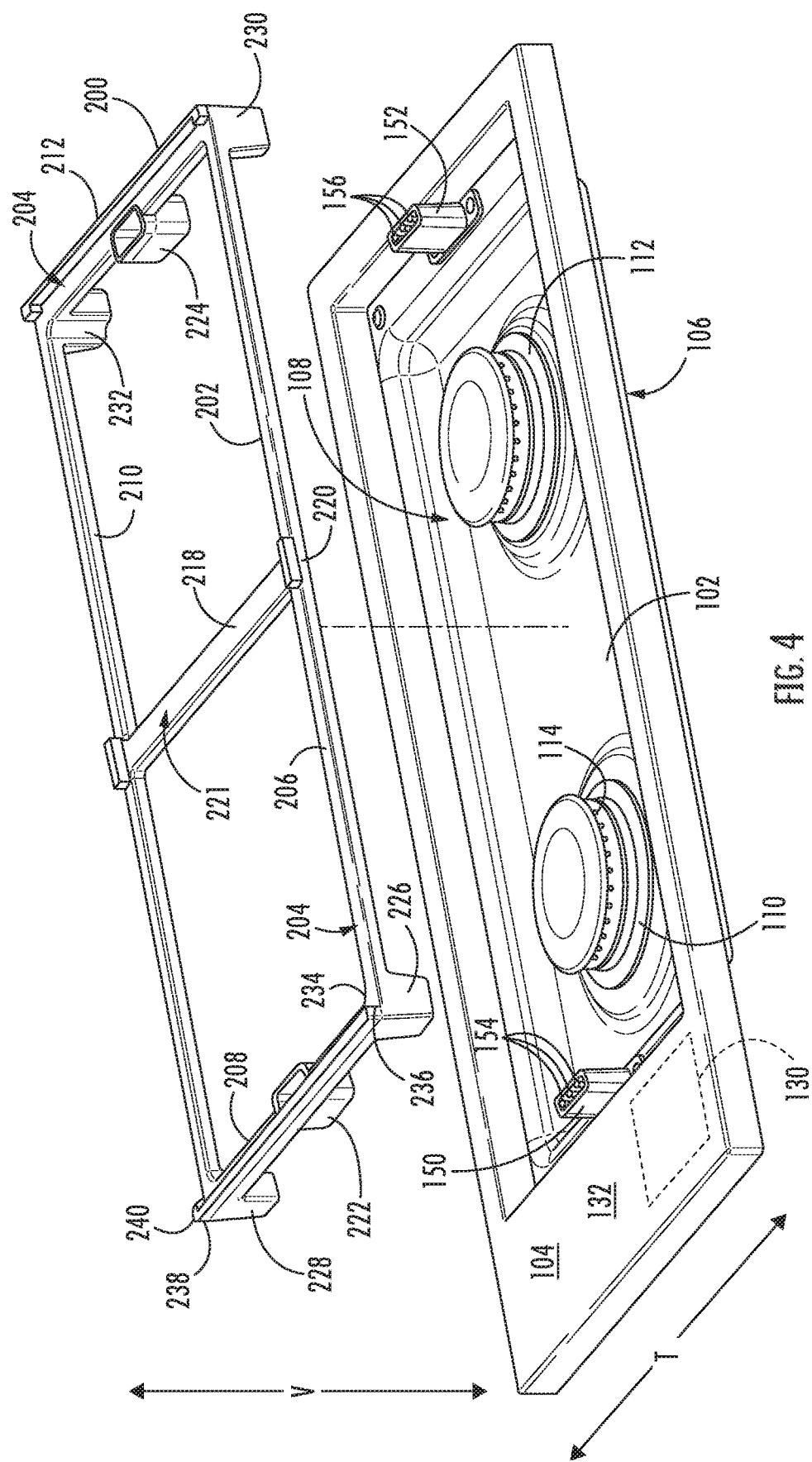
FIG. 4 provides a partially exploded view of the example cooktop appliance of FIG. 3.
Figure 5:
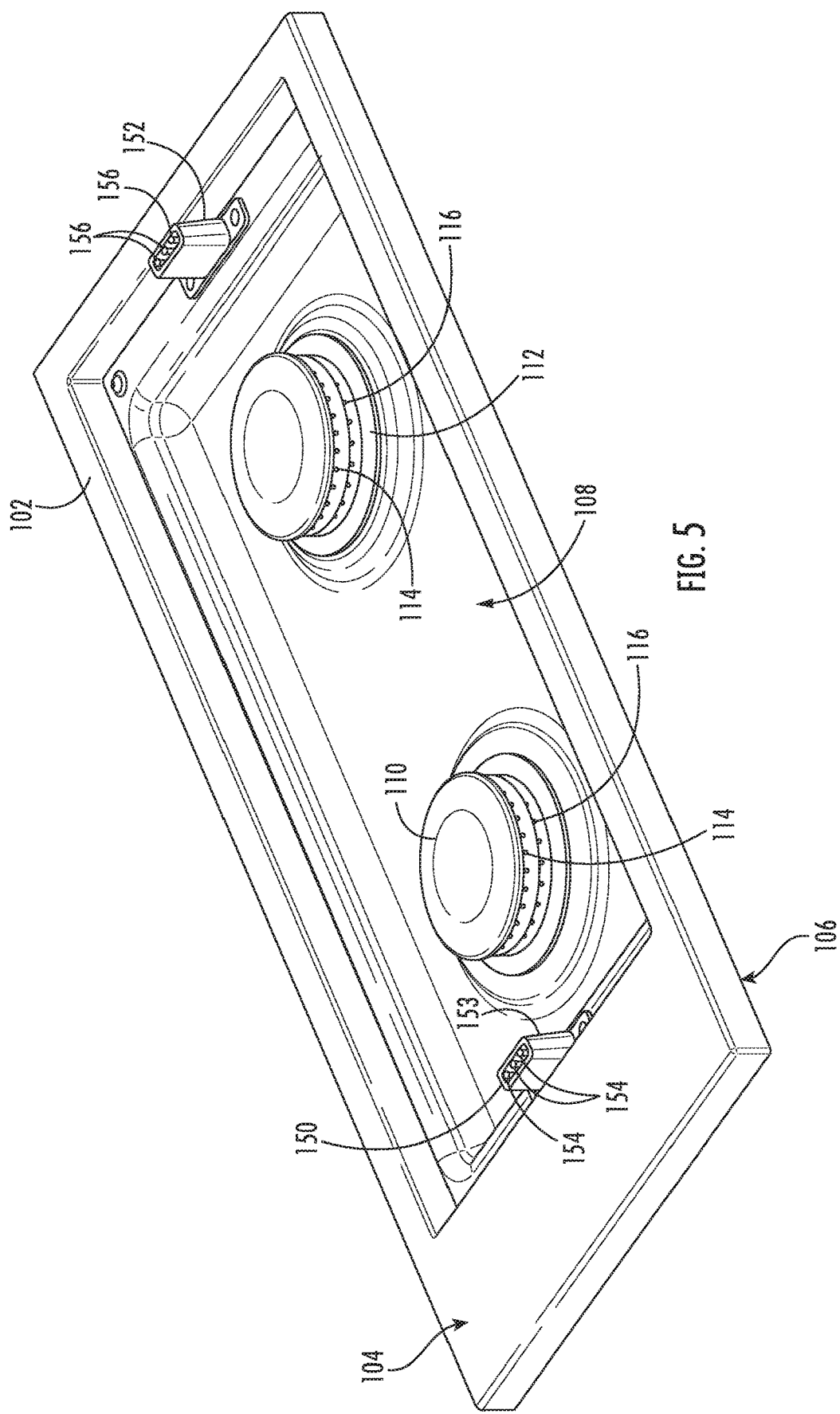
FIG. 5 provides a perspective view of a top panel with a burner and a pogo pin terminal block disposed thereon, such as may be incorporated into a cooktop appliance according to one or more embodiments of the present disclosure.

FIGS. 1 through 5 illustrate an exemplary a cooktop appliance 100 according to one or more example embodiments of the present disclosure. The example cooktop appliance 100 includes a panel 102 that extends in a lateral direction L and a transverse direction T, e.g., perpendicular to a vertical direction V. Each of the vertical direction V, lateral direction L, and transverse direction T is mutually perpendicular to every other of the vertical direction V, the lateral direction L, and the transverse direction T, such that an orthogonal direction system is formed. More particularly, FIG. 1 depicts the exemplary cooktop appliance 100 with a frame 200 mounted on the panel 102 and a pair of grates 400, 402 mounted on the frame 200, while FIG. 2 depicts the exemplary cooktop appliance 100 with the first grate 400 lifted off of the frame 200, and FIG. 3 depicts the panel 102 and frame 200 with both grates 400 and 402 of the pair of grates 400, 402 removed. FIG. 4 depicts the exemplary cooktop appliance 100 with the frame 200 lifted off of the panel 102, and FIG. 5 depicts the panel 102 with the frame 200 and grates 400, 402 all removed. The panel 102 may include a top surface 104 and a bottom surface 106. By way of example, the panel 102 may be constructed of enameled steel, stainless steel, glass, ceramics, and combinations thereof.

As may be seen, e.g., in FIGS. 1 through 5, the cooktop appliance 100 may include a plurality of burners. For example, the cooktop appliance 100 may include a first burner 110 disposed on the panel 102 and a second burner 112 spaced apart from the first burner 110 on the panel 102. For example, as illustrated, the first burner 110 and the second burner 112 may be aligned along the transverse direction T and spaced apart along the lateral direction L. The panel 102 may also include a recessed portion 108, e.g., which extends downward along the vertical direction V. The first and second burners 110 and 112 may be positioned within the recessed portion 108. The recessed portion 108 may collect spilled material, e.g., foodstuffs, during operation of the cooktop appliance.

The cooktop appliance 100 may also include a user interface panel 132 located within convenient reach of a user of the cooktop appliance 100. In various embodiments, the user interface panel 132 may include user inputs 134, such as knobs, buttons, or a touchscreen, etc., which are generally understood by those of ordinary skill in the art and are therefore not shown or described in extensive detail herein for the sake of brevity and clarity. The user inputs 134 may allow the user to activate one or more burners and determine an amount of heat provided by each gas burner. The user interface panel 132 may also be provided with one or more graphical display devices that deliver certain information to the user, e.g., whether a particular burner is activated and/or the output level at which the burner is set.

Operation of the cooktop appliance 100 can be regulated by a controller 130 that is operably coupled to (i.e., in operative communication with) the user inputs and/or gas burners. For example, in response to user manipulation of the user input(s), the controller 130 operates one or more of the burners 110, 112. By way of example, the controller 130 may include a memory and one or more processing devices such as microprocessors, CPUs or the like, such as general or special purpose microprocessors operable to execute programming instructions or micro-control code associated with operation of appliance 100. The memory may represent random access memory such as DRAM, or read only memory such as ROM or FLASH. In some embodiments, the processor may execute programming instructions stored in non-transitory memory. For example, the instructions may include a software package configured to operate appliance 100 and execute an operation routine such as one or more methods of operating the cooktop appliance 100. The memory may be a separate component from the processor or may be included onboard within the processor. The controller 130 may be programmed to operate the cooktop appliance 100 by executing instructions stored in memory. For example, the instructions may be software or any set of instructions that when executed by the processing device, cause the processing device to perform operations. Controller 130 may be configured to perform a variety of computer-implemented functions and/or instructions (e.g. performing methods, steps, calculations and the like and storing relevant data). It should be noted that controllers 130 as disclosed herein are capable of and may be operable to perform any methods and associated method steps as may be disclosed herein.

The controller 130 may be disposed in a variety of locations throughout appliance 100. Input/output ("I/O") signals may be routed between the controller 130 and various operational components of appliance 100, such as the gas burners 110, 112, inputs, a graphical display, one or more sensors, and/or one or more alarms.

Generally, each gas burner 110, 112 includes a generally circular shape from which a flame may be emitted. As shown, each gas burner 110, 112 includes a plurality of fuel ports 114 defined circumferentially therearound. Each fuel port 114 is in fluid communication with an internal passage of each respective burner 110, 112. In some embodiments, e.g., as illustrated in FIG. 5, one or both of the first burner 110 and the second burner 112 may be a multi-ring burner. For example, as illustrated in FIG. 5, the first burner 110 may include a first plurality of fuel ports 114 defining a first ring of the burner 110 and a second plurality of fuel ports 116 defining a second ring of the burner 110. In such embodiments, a first fuel chamber in fluid communication with the first plurality of fuel ports 114 may be separated from a second fuel chamber in fluid communication with the second plurality of fuel ports 116 by a wall within the burner 110, and the burner may be configured to selectively supply fuel to one or both of the fuel chambers. In some embodiments of a cooktop appliance, multiple burners of differing types may be provided in combination, e.g., one or more single-ring burners as well as one or more multi-ring burners. Moreover, other suitable burner configurations are also possible.

The controller 130 may be in operative communication with one or more temperature sensors. For example, as will be described in more detail below, the controller 130 may be selectively in operative communication with one or more embedded temperature sensors 450 in one or more grates 400, 402 via pogo pin terminal blocks positioned on, e.g., mounted to, the panel 102. In some embodiments, the cooktop appliance 100 may therefore include a first pogo pin terminal block 150 and a second pogo pin terminal block 152.

Figure 6:
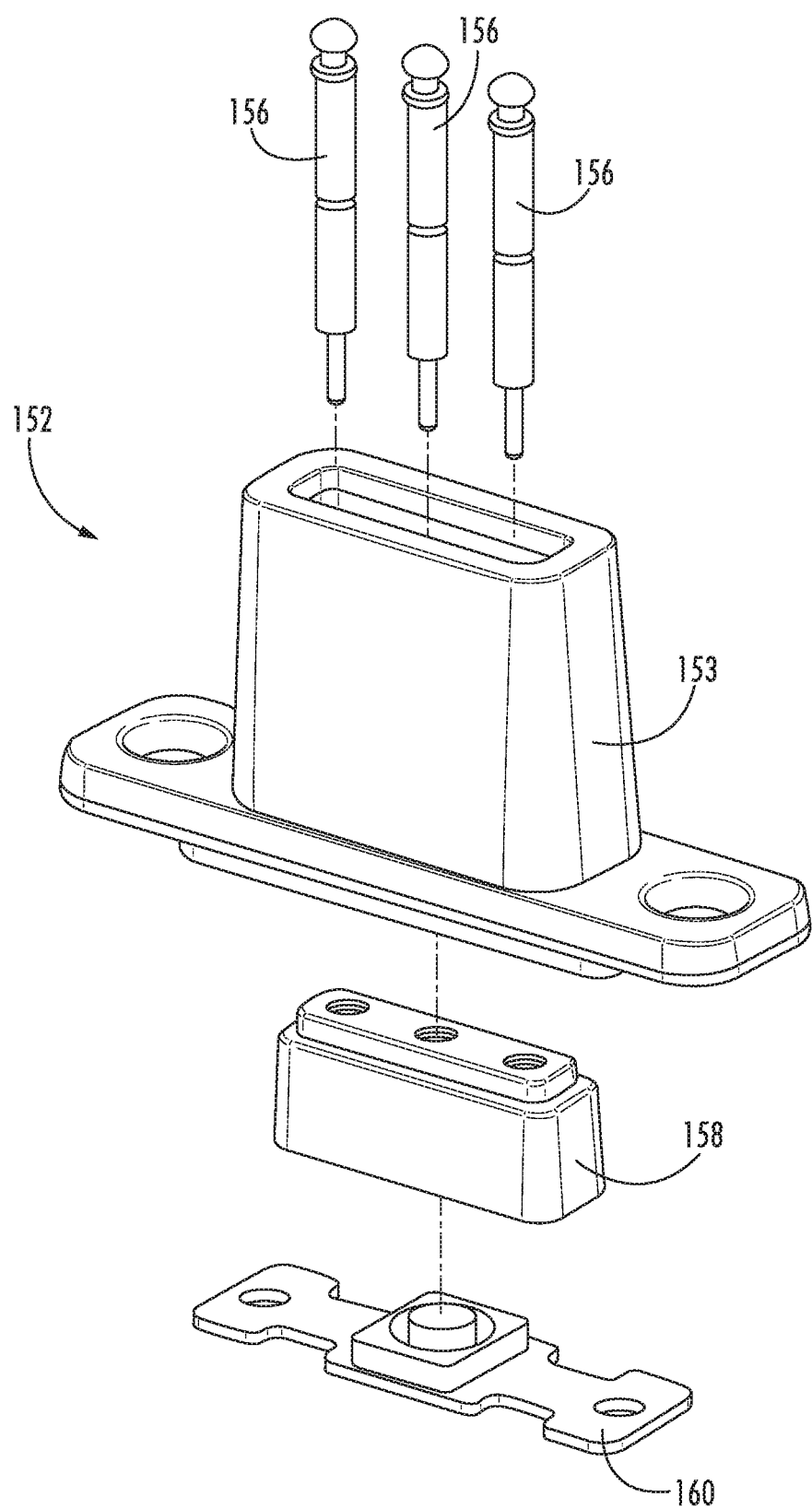
FIG. 6 provides an exploded view of a pogo pin terminal block such as may be incorporated into a cooktop appliance according to one or more embodiments of the present disclosure.
Figure 7:
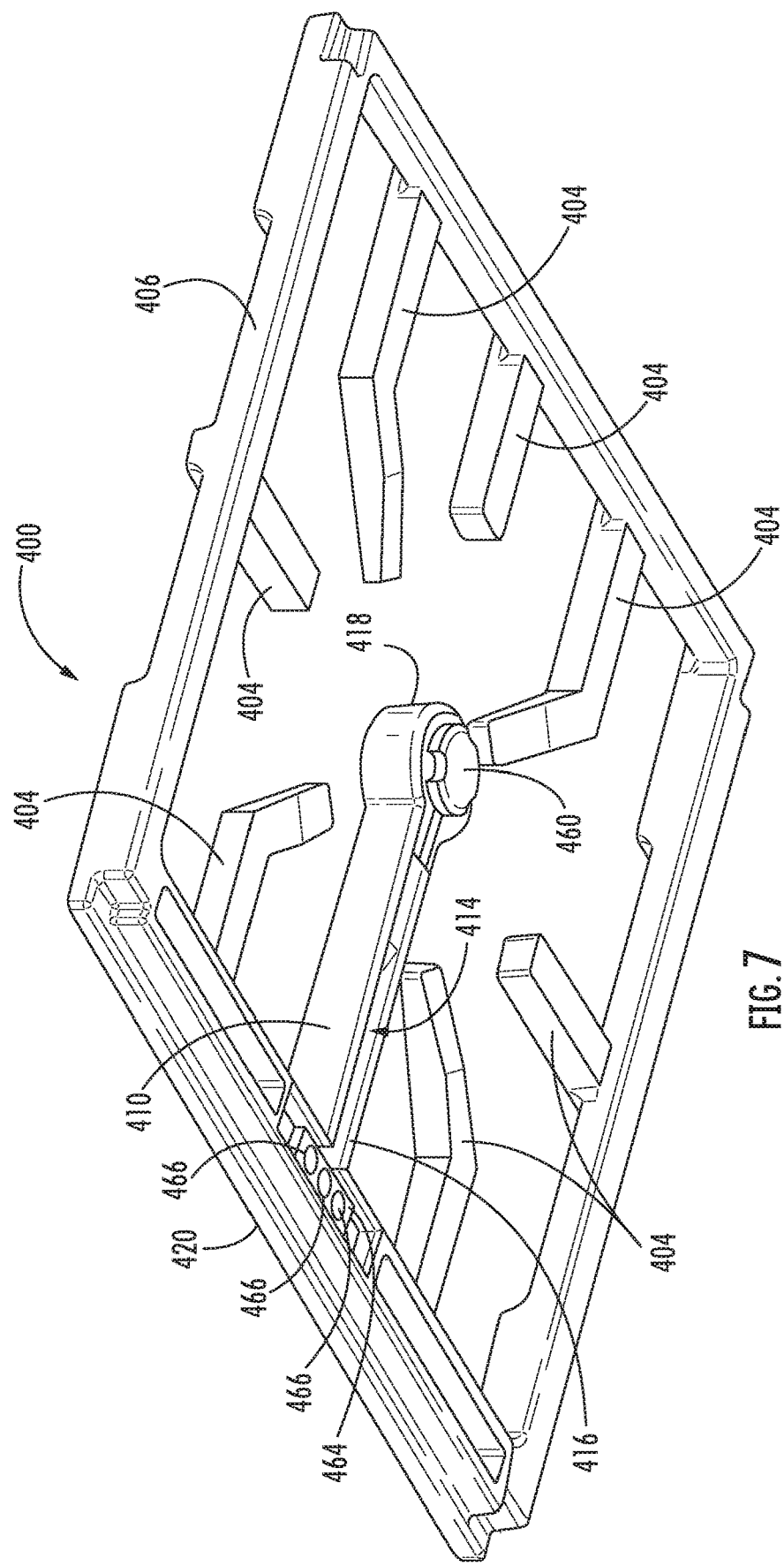
FIG. 7 provides a perspective view of an example grate having an embedded temperature sensor therein as may be incorporated into a cooktop appliance in one or more example embodiments of the present disclosure.

As best seen in FIGS. 5 and 6, the first and second connectors 154 and 156 of the first pogo pin terminal block 150 and second pogo pin terminal block 152 may be positioned in a housing 153 mounted on the panel 102, e.g., where the housing 153 is on and extending from the top surface 104 of the panel 102, such that the housing 153 elevates the respective connectors 154, 156 of each pogo pin terminal block 150 or 152 above the top surface 104 of the panel 102 and away from the recessed portion 108 where spills collect. Also as illustrated in FIG. 6, each pogo pin terminal block 150, 152 may include a connector block 158 and a baseplate 160. Only the second pogo pin terminal block 152 is illustrated in FIG. 6, although it should be understood that the first and second pogo pin terminal blocks 150 and 152 are substantially identical, e.g., apart from their respective locations.

In some embodiments, the first pogo pin terminal block 150 may be positioned on the panel 102 adjacent to the first burner 110 and the second pogo pin terminal block 152 may be positioned on the panel 102 adjacent to the second burner 112. For example, the first pogo pin terminal block 150 may be positioned opposite the second burner 112, e.g., about the first burner 110, along the lateral direction L, and the second pogo pin terminal block 152 may be positioned opposite the first burner 110, e.g., about the second burner 112, along the lateral direction L. As mentioned above, the first burner 110 and the second burner 112 may be aligned with each other along the transverse direction T. In such embodiments, the first pogo pin terminal block 150 may be aligned with the first burner 110 along the transverse direction T and the second pogo pin terminal block 152 may be aligned with the second burner 112 along the transverse direction T. Thus, in some embodiments, the first burner 110 and the second burner 112 may be aligned with each other and with the first pogo pin terminal block 150 and the second pogo pin terminal block 152 along the transverse direction T.

The first pogo pin terminal block 150 and the second pogo pin terminal block 152 may each include at least three connectors, such as at least three spring loaded pins or at least three contact pads. For example, the first pogo pin terminal block 150 may include first connectors 154, e.g., three spring-loaded pins 154 in the illustrated example embodiment, and the second pogo pin terminal block 152 may include second connectors 156, e.g., a second set of three spring-loaded pins 156, where the illustrated spring-loaded pins are an example embodiment of first and second connectors 154 and 156 of the first and second pogo pin terminal blocks 150 and 152. In some embodiments, the first connectors 154 and the second connectors 156 may be positioned above the first burner 110 and the second burner 112 along the vertical direction V. In some embodiments, the first connectors 154 and the second connectors 156 may be positioned outside of, e.g., above along the vertical direction V, the recessed portion 108 of the panel 102. Thus, the connectors 154 and 156 may be protected from spillage, e.g., by positioning the connectors 154 and 156 above the recessed portion 108 of the panel 102 and/or by enclosing the connectors 154 and 156, where example embodiments of enclosing the connectors 154 and 156 will be described below.

The cooktop appliance 100 may also include a frame 200 which may be mounted, such as removably mounted, to the top surface 104 of the panel 102. The frame 200 may be configured to selectively support two or more grates 400, 402 (FIGS. 1 and 2) over the first burner 110 and the second burner 112.

The frame 200 may thusly be positioned above the first burner 110 and the second burner 112, e.g., along the vertical direction V. For instance, in some embodiments, the frame 200 may span the two burners 110 and 112, e.g., the frame 200 may consist of a single piece spanning unsupported across the first burner 110 and the second burner 112.

The frame 200 may include a first sleeve 222 which encloses the first connectors 154 of the first pogo pin terminal block 150 on four sides when the frame 200 is mounted to the top surface 104 of the panel 102 and a second sleeve 224 which encloses the second connectors 156 of the second pogo pin terminal block 152 on four sides when the frame 200 is mounted to the top surface 104 of the panel 102.

For example, the frame 200 may include or consist of four corners, and may have a leg extending generally along the vertical direction V at each corner. The sleeves 222 and 224 of the frame 200 may be positioned between the corners, e.g., between the legs. The legs of the frame 200 may be positioned on panel 102, e.g., may extend from an outer rail 202 of the frame 200 to the top surface 104 of panel 102 when the frame 200 is mounted on the panel 102. In some embodiments, the frame 200 may include a first leg 226 and a second 228 leg positioned opposite the first leg 226 along the transverse direction T. For example, the first leg 226 and the second leg 228 may be aligned with the first sleeve 222 along the transverse direction T with the first sleeve 222 positioned between the first leg 226 and the second leg 228. In some embodiments, the frame 200 may further include a third leg 230 and a fourth leg 232 positioned opposite the third leg 230 along the transverse direction T. For example, the third leg 230 and the fourth leg 232 may be aligned with the second sleeve 224 along the transverse direction T with the second sleeve 224 positioned between the third leg 230 and the fourth leg 232.

The first leg 226 and the second leg 228 may be disposed on the frame 200 opposite the third leg 230 and fourth leg 232 along the lateral direction L. In some embodiments, the frame 200 may span unsupported across the first burner 110 and the second burner 112, e.g., without any legs or other portions of the frame 200 resting on the panel 102 between the legs 226, 228, 230, and 232, and/or between the burners 110 and 112, along the lateral direction L. The first burner 110 and the second burner 112 may be positioned between the first leg 226 and the third leg 230 along the lateral direction L when the frame 200 is mounted to the top surface 104 of the panel 102. For example, the burners 110 and 112 may be between the first pair of legs, e.g., the first and second legs 226 and 228, and the second pair of legs, e.g., the third and fourth legs 230 and 232, along the lateral direction L.

As mentioned, the frame 200 may include an outer rail 202. The outer rail 202 of the frame may extend around a perimeter of the frame, such as completely around the entire perimeter of the frame 200 and may define a peripheral support surface 204, e.g., for at least partially supporting the grates 400, 402 thereon. For example, the peripheral support surface 204 may be configured to selectively support a first grate 400 on a first portion, e.g., half, of the peripheral support 204 surface and a second grate 402 on a second portion, e.g., a second half, of the peripheral support surface 204 adjacent to the first portion.

In some embodiments, the outer rail 202 of the frame 200 comprises a front portion 206, a left side portion 208, a back portion 210 parallel to the front portion 206, and a right side portion 212 parallel to the left side portion 208. The front portion 206 and the back portion 210 may be spaced apart by the left side portion 208 and the right side portion 212, e.g., the back portion 210 may be positioned at an opposite end of each of the left side portion 208 and the right side portion 212 from the front portion 206. The left side portion 208 and the right side portion 212 may each extend perpendicular to the front portion 206 and the back portion 210. For example, the left side portion 208 may extend from a left end 234 of the front portion 206 at a front end 236 of the left side portion 208 to a back end 238 of the left side portion 209. The back portion 210 may extend from the back end 238 of the left side portion 208 at a left end 240 of the back portion 210 to a back end 242 of the right side portion 212 at a right end 244 of the back portion 210. The right side portion 212 may extend from the back end 242 of the right side portion 212 to a front end 246 of the right side portion 212 at a right end 248 of the front portion 206.

The frame 200 may also include a crossbar 218 extending through the frame 200 at about the middle of the frame 200. For example, the crossbar 218 may extend from a midpoint 220 of the front portion 206 to a midpoint 219 of the back portion 210. In some embodiments, the peripheral support surface 204 may be defined along the front portion 206, the left side portion 208, the back portion 210, and the right side portion 212, and the crossbar 218 may define an intermediate support surface 221. The intermediate support surface 221 may be configured to selectively support the first grate 400 at a first side of the intermediate support surface 221 and the second grate 402 at a second side of the intermediate support surface 221.

The frame 200 may be formed of cast metal, such as cast iron or steel, such that the outer rail 202, cross-bar 218, legs 226, 228, 230, and 232, and sleeves 222 and 224 are formed from a single, seamless piece of metal. Frame 200 may be removable from panel 102, e.g., by lifting upwardly on the frame 200.

Moreover, it is understood that further additional or alternative embodiments of the frame 200 may be placed over only one burner assembly or more than two burner assemblies.

As shown in FIGS. 1 and 2, in some embodiments, the cooktop appliance includes one or more grates, e.g., the frame 200 may be configured to receive and support a first and second selectively removable grates 400 and 402. Each grate 400 and 402 may extend at least partially above a corresponding burner 110, 112 when the grates 400 and 402 are in a mounted position on the frame 200 and the frame 200 is mounted on the panel 102. Generally, each grate 400, 402 is configured for supporting a cooking utensil, such as a pot, pan, etc., on top of the grate 400 and/or 402 when the grates 400 and 402 are in the mounted position on the frame 200.

For example, each grate 400 and 402 of the exemplary embodiment includes a plurality of fingers 404, e.g., formed of cast metal, such as cast iron. The cooking utensil may be placed on the fingers 404 of one of the grates 400 and 402 such that the cooking utensil rests on a top surface 468 of some or all of the fingers of the plurality of fingers 404. The first grate 400 may include a first outer frame 406 that extends around or defines a perimeter of the first grate 400. The second grate 402 may include a second outer frame 408 that extends around or defines a perimeter of the second grate 402. Thus, each outer frame 406, 408 may be disposed at an outer portion of the respective grate 400 or 402. The fingers 404 of each grate 400 and 402 may extend from the respective outer frame 406 or 408.

When mounted, the grates 400, 402 may selectively rest on the frame 200, such as on the peripheral support surface 204 and the intermediate support surface 221 thereof. For example, the first outer frame 406 may be supported by the left side portion 208, a left half of the front portion 206, a left half of the back portion 210, and a left side of the intermediate support surface 221. In such embodiments, the second outer frame 408 may be supported by the right side portion 212, a right half of the front portion 206, a right half of the back portion 210, and a right side of the intermediate support surface 221.

As shown, e.g., in FIG. 2, the grates 400 and 402 may be selectively removable (e.g., to an unmounted position), such that the grates 400 and 402 can be readily lifted from the frame 200.

The plurality of fingers 404 includes a first sensor finger 410 on the first grate 400 and a second sensor finger 412 on the second grate 402. Sensor fingers 410 and 412 each support a temperature sensor 450 that is operable to measure a temperature of a cooking utensil on the respective grate 400 or 402. The first sensor finger 410 is illustrated in FIGS. 7 through 11 and it should be understood that the second sensor finger 412 provides the same or similar, e.g., mirrored, features as those shown and described for first sensor finger 410. As may be seen in FIGS. 7 through 11, the first sensor finger 410 defines a slot 414 at a bottom surface 416 of the sensor finger 410. Each slot 414 is open and faces downward, e.g., along the vertical direction V, such as towards the panel 102 when the grate 400 is in the mounted position on the panel 102. Thus, slot 414 is exposed and accessible at the bottom surface 416 of each sensor finger 410, 412.

Figure 8:
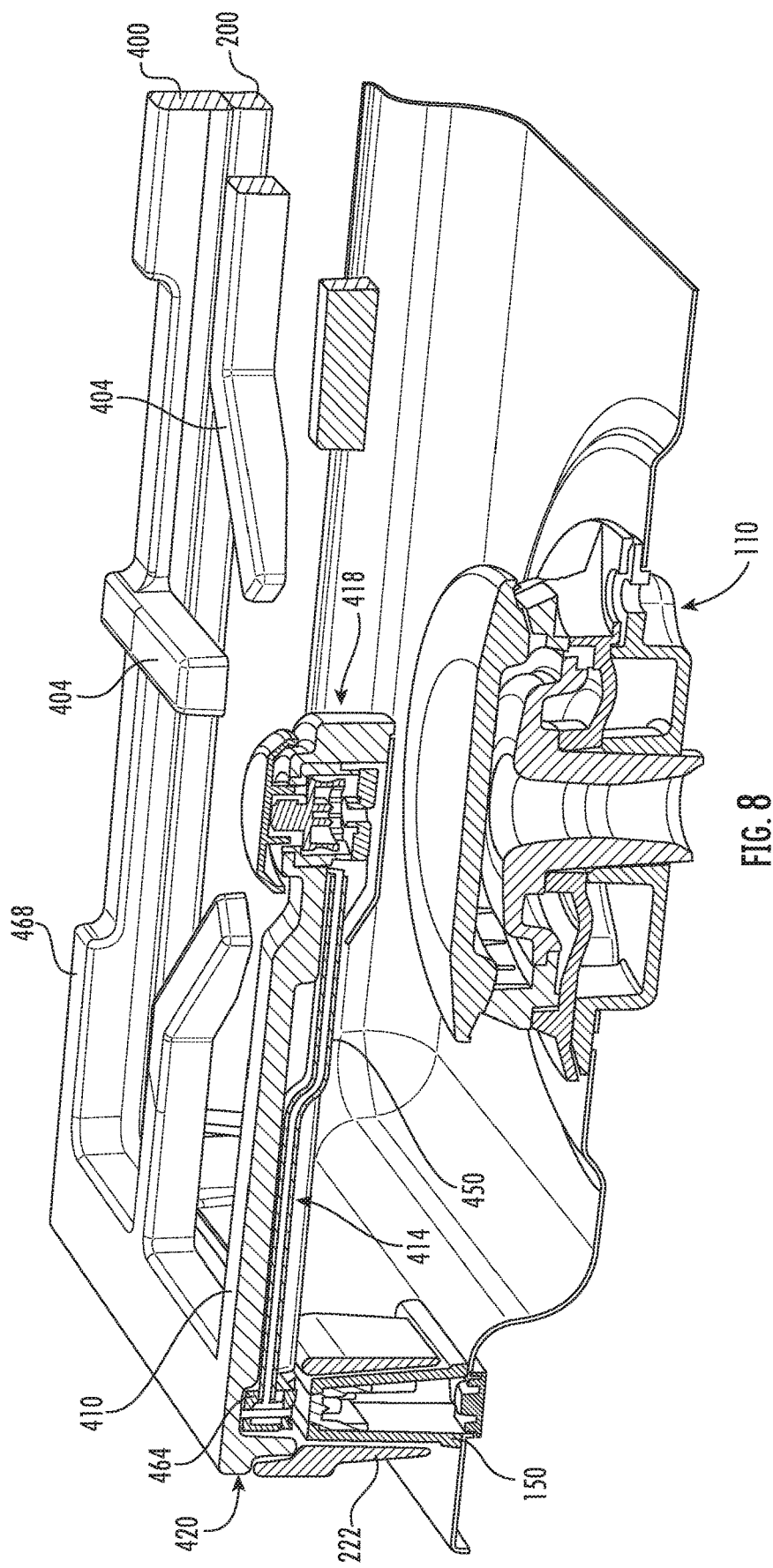
FIG. 8 provides a section view of a portion of the example cooktop appliance of FIG. 1.
Figure 9:
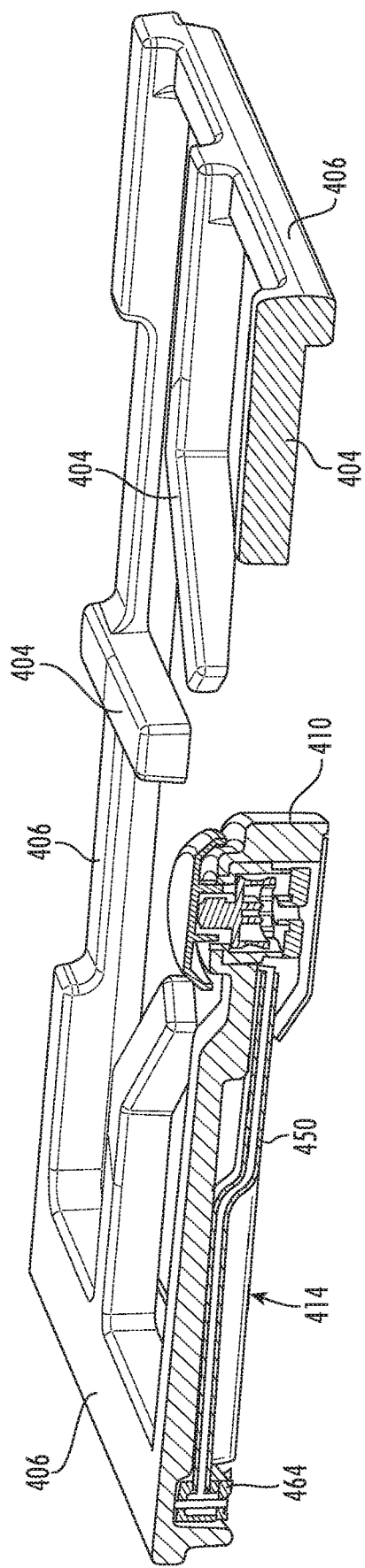
FIG. 9 provides a section view of the grate of FIG. 7.

As best seen in FIGS. 7 through 11, the sensor finger 410 extends between a first end 418 and a second end 420. In some embodiments, sensor finger 410 may be elongated between the first and second ends 418, 420 of sensor finger 410. Second end 420 of sensor finger 410 may be positioned at the outer frame 406 of the grate 402. Conversely, first end 418 of sensor finger 410 may be spaced from the outer frame 406, and may be positioned above the corresponding gas burner 110 or 112 when the grate 400 or 402 is mounted on the frame 200, e.g., as illustrated in FIG. 8. Slot 414 may also extend between a first end 422 and a second end 424. First end 422 of slot 414 may be positioned at first end 418 of sensor finger 410, and second end 424 of slot 414 may be positioned at second end 420 of sensor finger 410. Thus, slot 414 may extend along the length of sensor finger 410.

Figure 10:
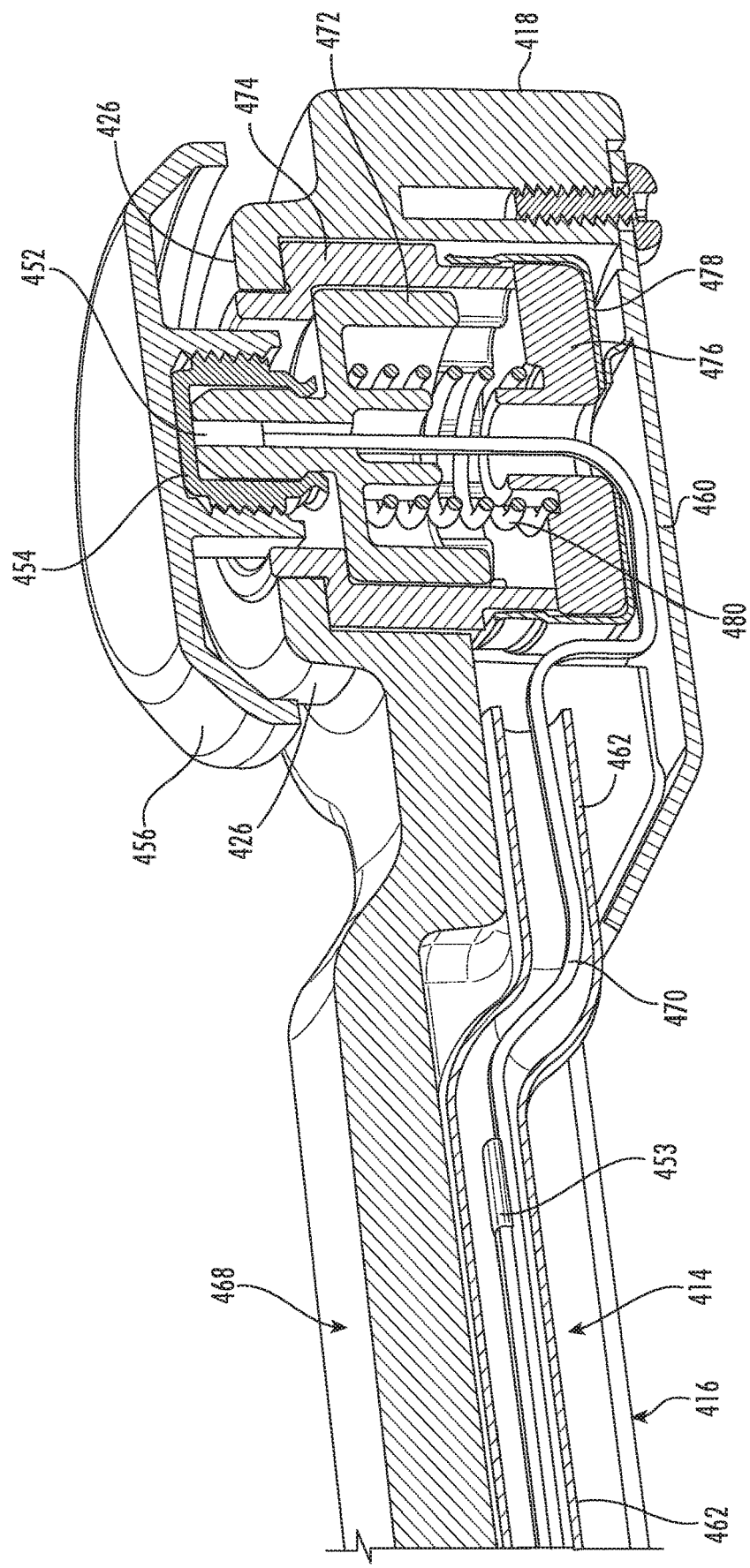
FIG. 10 provides an enlarged section view of a portion of the grate of FIG. 9.
Figure 11:
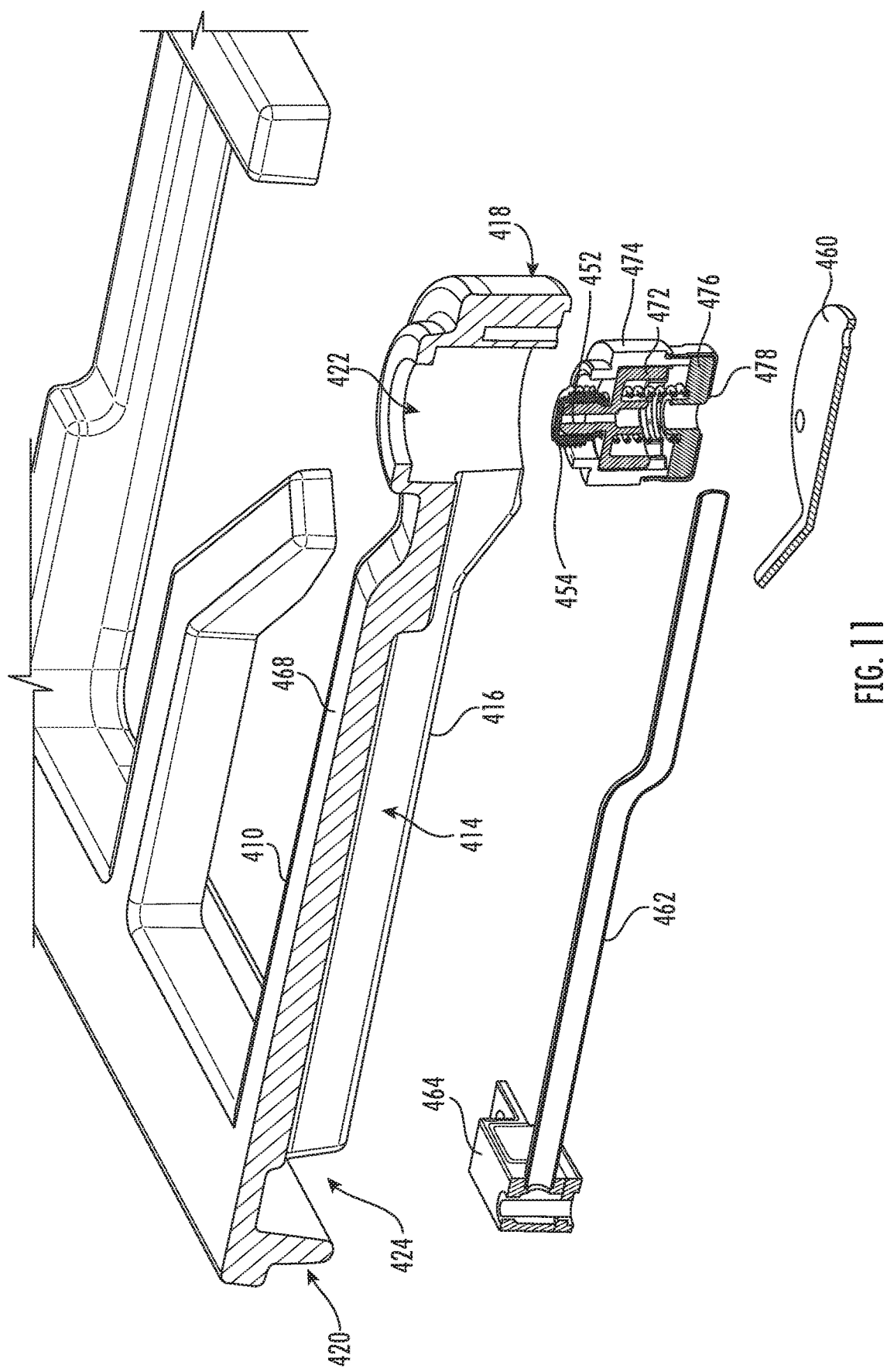
FIG. 11 provides an exploded sectional view of a sensor finger according to one or more example embodiments of the present disclosure.
Figure 12:
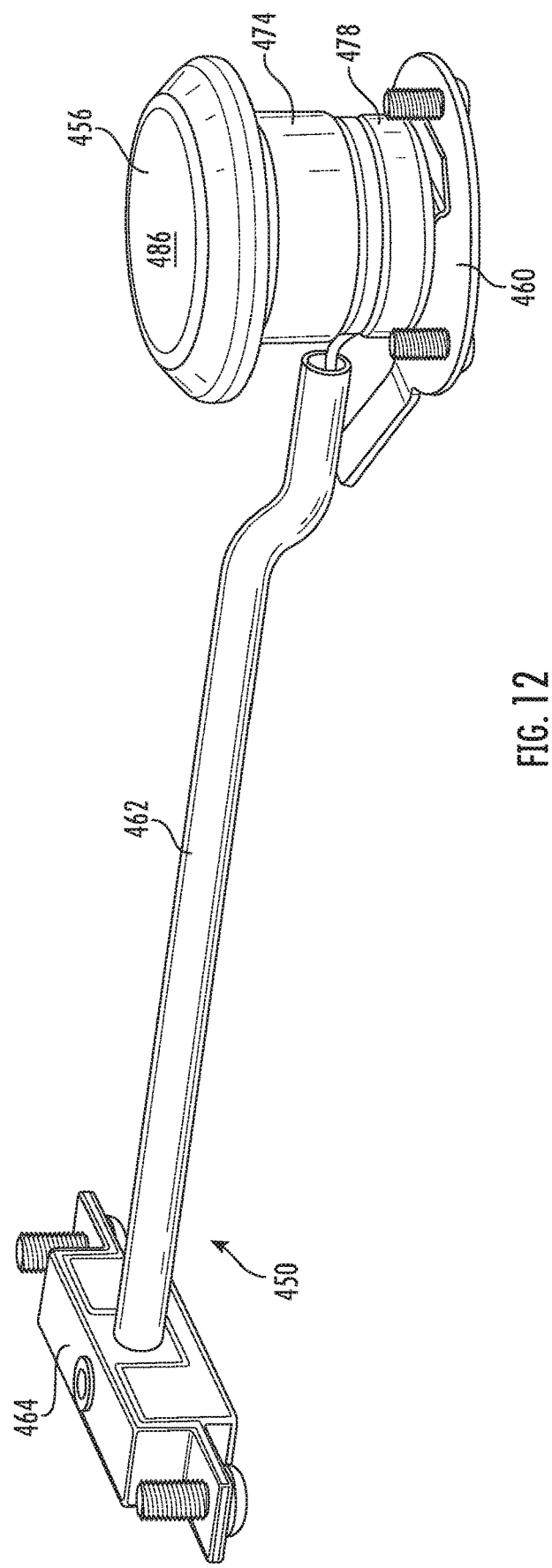
FIG. 12 provides a perspective view of an exemplary temperature sensor as may be incorporated into a cooktop appliance according to one or more embodiments of the present disclosure.
Figure 13:
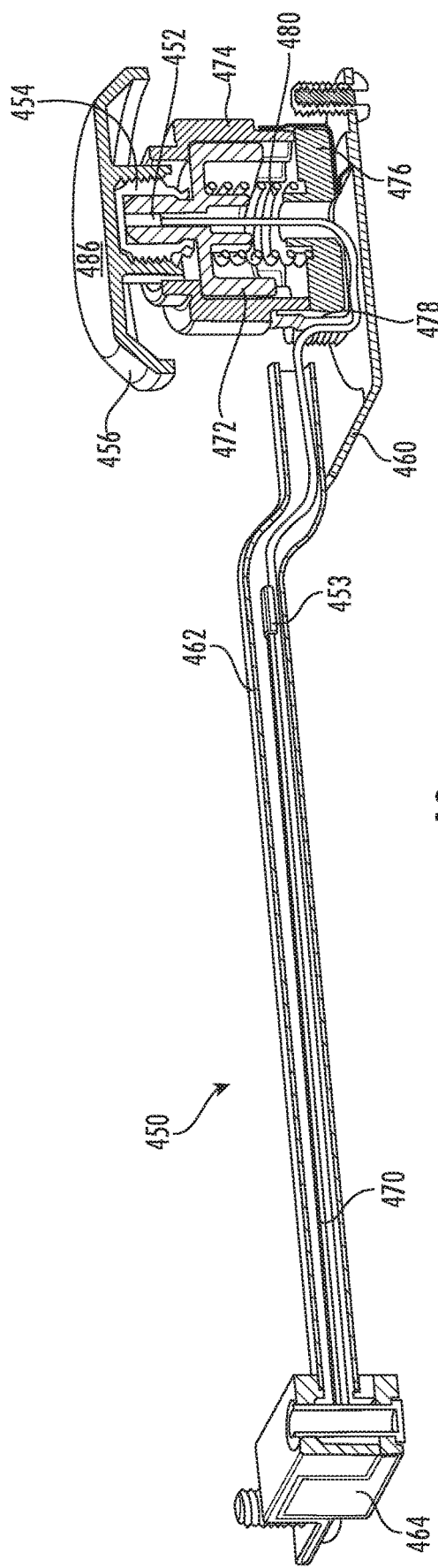
FIG. 13 provides a section view of the temperature sensor of FIG. 12.
Figure 15:
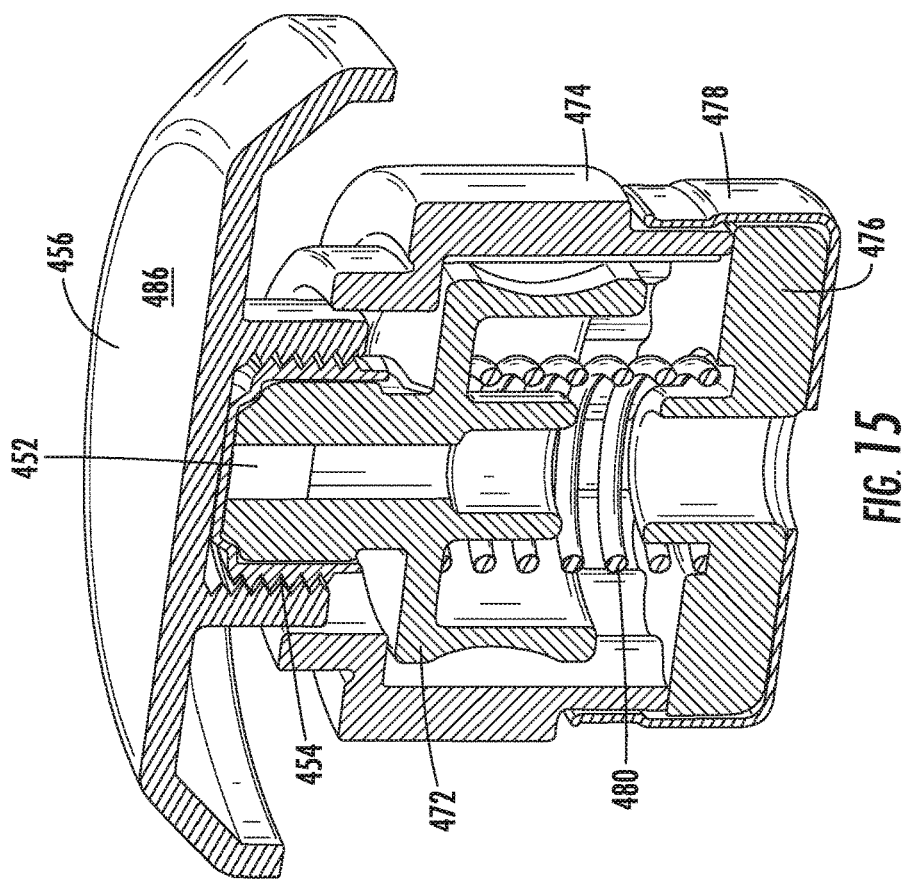
FIG. 15 provides a section view of a portion of the temperature sensor of FIG. 12 with a heat transfer cap attached thereto.
Figure 14:
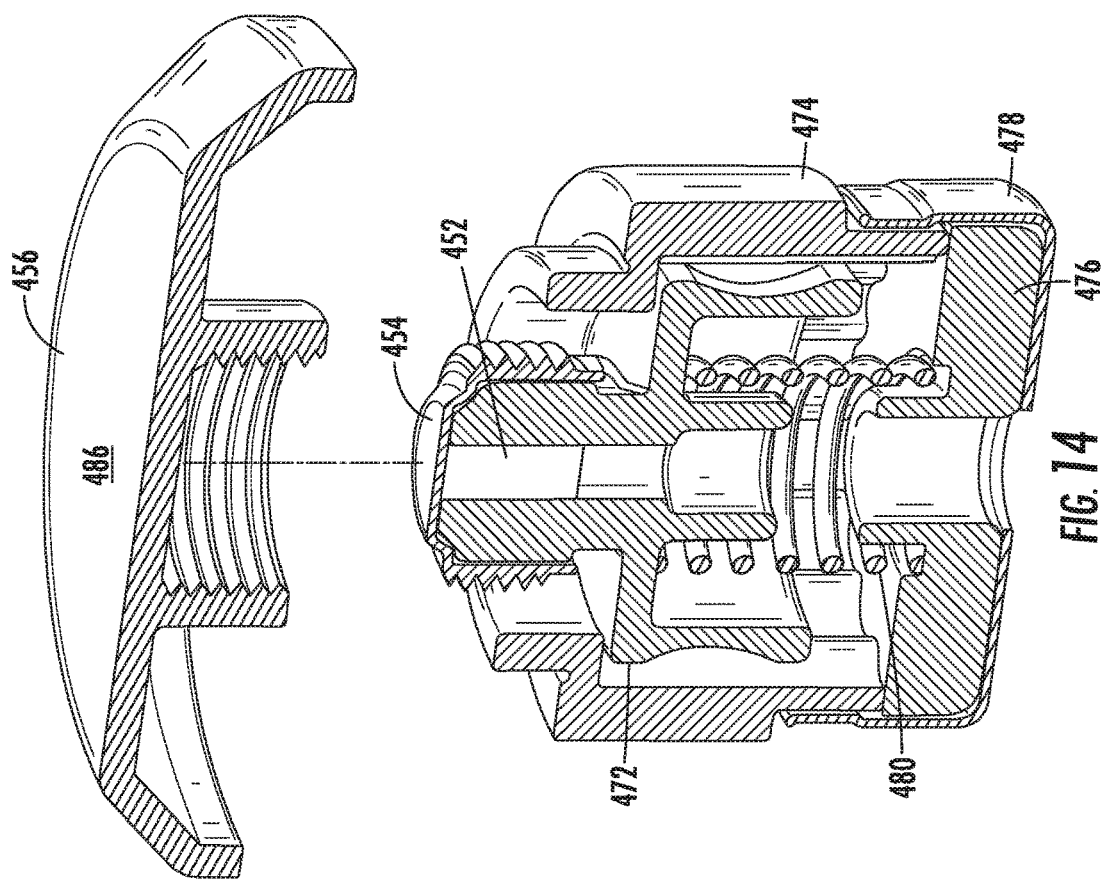
FIG. 14 provides a section view of a portion of the temperature sensor of FIG. 12 with a heat transfer cap detached therefrom.
Figure 16:
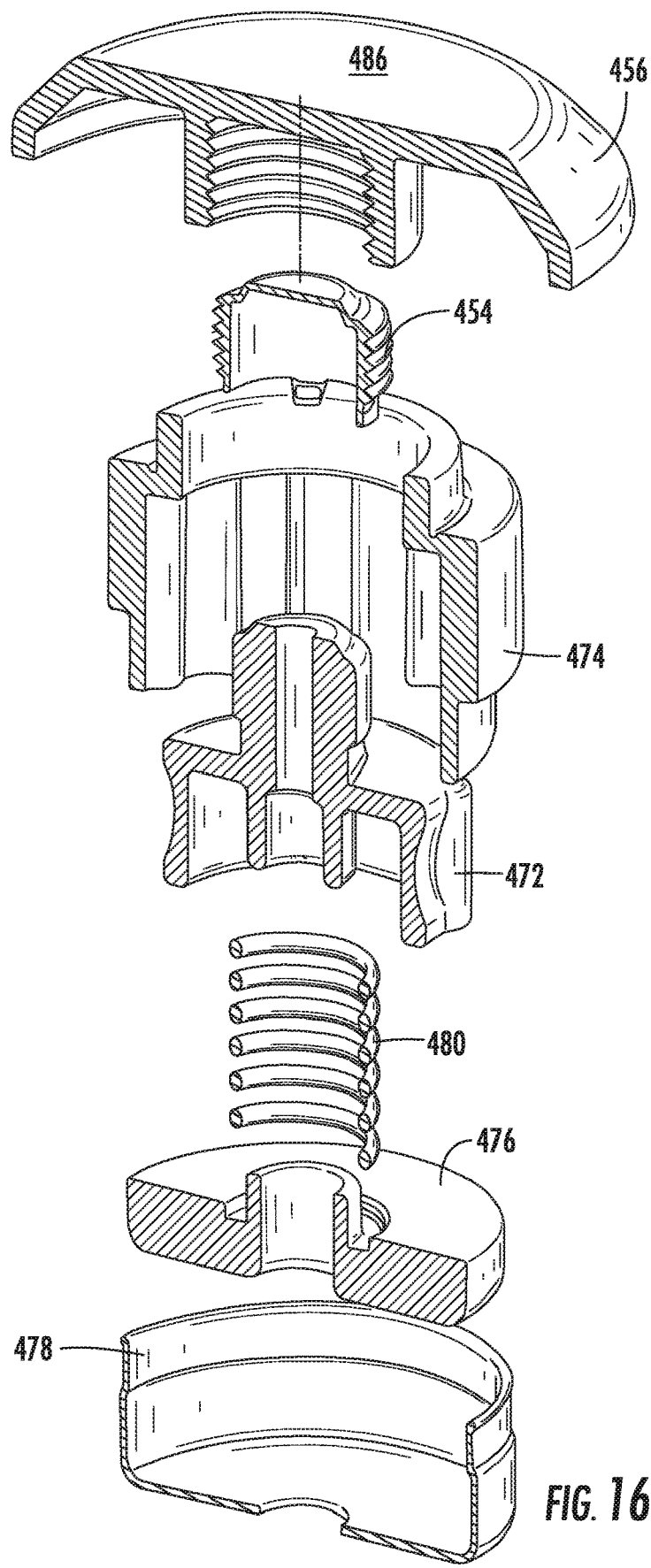
FIG. 16 provides an exploded section view of a portion of the temperature sensor of FIG. 12.
Figure 18:
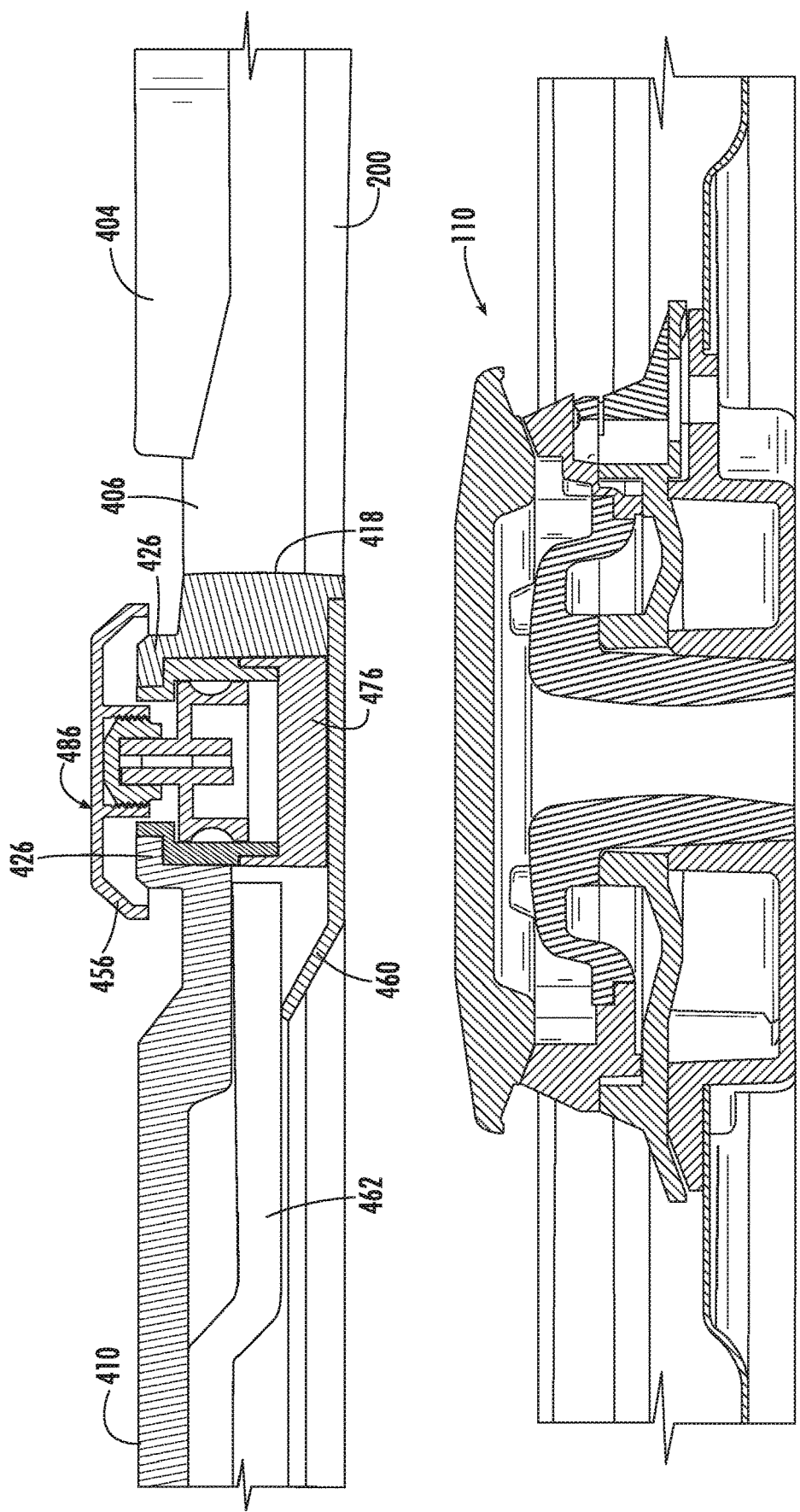
FIG. 18 provides a section view of a portion of a temperature sensor and an associated burner.
Figure 19:
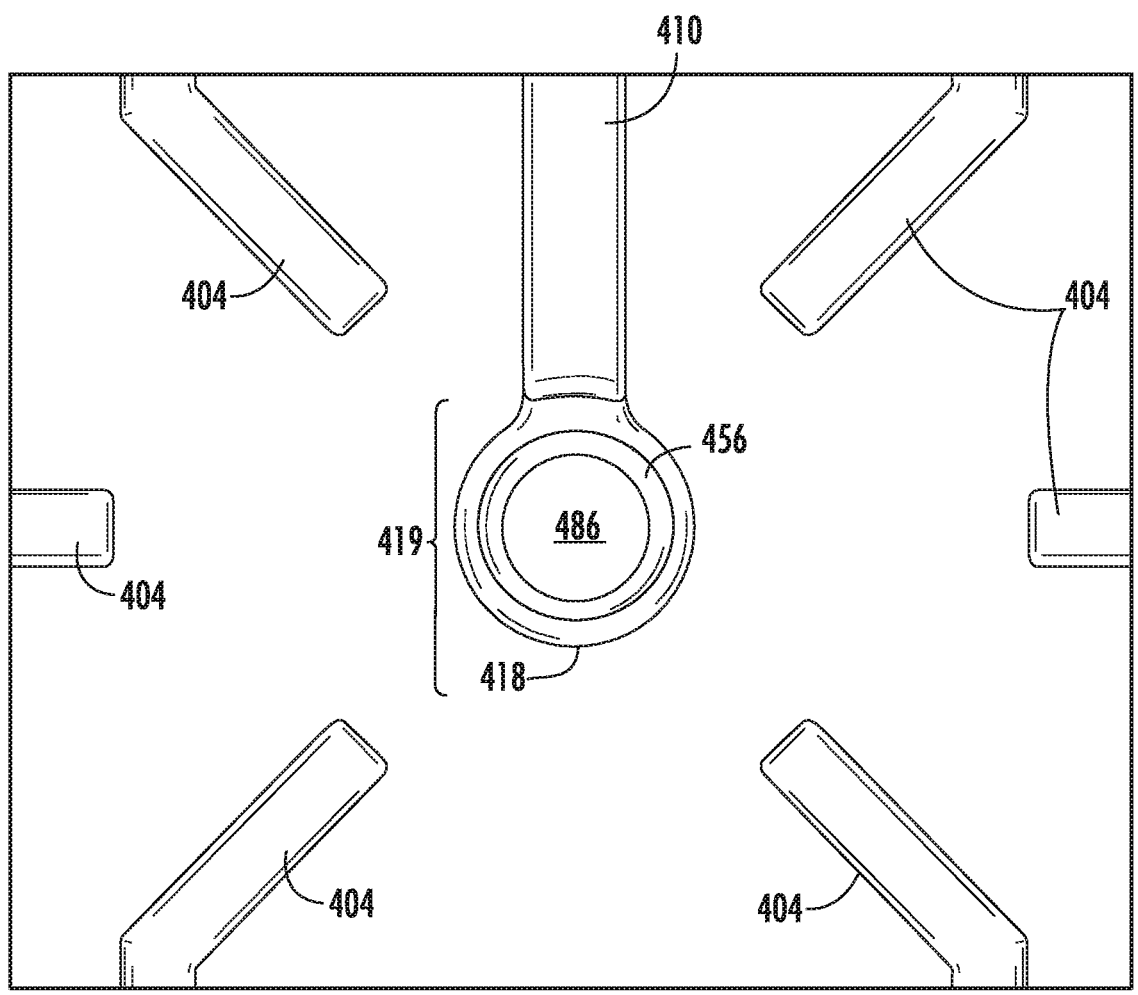
FIG. 19 provides a top down view of a portion of an example grate having an embedded temperature sensor therein as may be incorporated into a cooktop appliance in one or more example embodiments of the present disclosure.

Temperature sensor 450 is mounted to sensor finger 410, e.g., within the slot 414 as mentioned above. For example, temperature sensor 450 may include a first temperature probe 452 positioned at first end 418 of sensor finger 410 and/or first end 422 of slot 414 and a second temperature probe 453 positioned within the sensor finger 410. In particular, the sensor finger 410 may include a first end portion 419 proximate to the first end 418 (and including the first end 418), e.g., as indicated in FIGS. 10 and 19, and the temperature sensor 450 and/or the first temperature probe 452 thereof may be mounted in or at the first end portion 419. For example, as illustrated in FIGS. 8 and 18, the first temperature probe 452 may be positioned over gas burner 110 on sensor finger 410. In particular, first temperature probe 452 may be directly above, e.g., along the vertical direction, the burner 110, and/or may be positioned concentric with gas burner 110 on sensor finger 410. As mentioned, each finger of the plurality of fingers 404, including the sensor fingers 410 and 412, may include a top surface 468. The second temperature probe 453 may be positioned between the top surface 468 of the sensor finger 410 and the bottom surface 416 of the sensor finger. The first temperature probe 452 and the second temperature probe 453 may each be or include a resistance temperature detector, a thermocouple, an infrared temperature sensor, a bimetallic switch, etc.

As may be seen, e.g., in FIGS. 10 through 17, the temperature sensor 450 may include a thermally conductive top cap 454 above the first temperature probe 452. In particular, the first temperature probe 452 may be in direct contact with the top cap 454 such that the first temperature probe 452 is in direct conductive thermal communication with the top cap 454. The first temperature probe 452 may be at least partially thermally insulated from the grate 400, e.g., the metal of the sensor finger 410, and the burner 110. For example, the first temperature probe 452 may be disposed within a thermally insulative sensor body 472, e.g., the sensor body 472 may include a thermally insulative material, such as a ceramic material. The sensor body 472 may be received within a bushing 474 and a bottom insulator 476 may be positioned below the sensor body 472 and the bushing 474. Similar to the sensor body 472, the bushing 474 and the bottom insulator 476 may each also include thermally insulative material, such as a ceramic material. The bottom insulator 476 and the bushing 474 may be joined together by a bottom cap 478. For example, the bottom cap 478 may provide a press fit or interference fit with, e.g., the bushing 474. In some embodiments, the bottom cap 478 may be pressed on and/or may be crimped.

In some embodiments, the temperature sensor 450 may further include a heat transfer cap 456. The first temperature probe 452 may be positioned within the sensor body 472 with the heat transfer cap 456 over the first temperature probe 452. For example, the heat transfer cap 456 may be placed above the first temperature probe 452 along the vertical direction V. In some embodiments, the heat transfer cap 456 may be in conductive thermal communication with the first temperature probe 452. For example, the heat transfer cap 456 may be in direct contact with the top cap 454, which is in turn in direct contact with the first temperature probe 452, such that the heat transfer cap 456 is in conductive thermal communication with the first temperature probe 452 via the top cap 454. The heat transfer cap 456 may be removably mounted on the top cap 454. For example, the heat transfer cap 456 may be threadedly connected to the top cap 454, e.g., as illustrated in FIGS. 8-10 and 13, where the top cap 454 includes external threads and the heat transfer cap 456 includes mating internal threads which engage the external threads of the top cap 454. The heat transfer cap 456 may have a larger diameter than the first temperature probe 452 and the top cap 454 in order to prevent or minimize spilled material contaminating the temperature sensor 450, such as the probe 452 or other internal components thereof. Also, when the heat transfer cap 456 is removably connected to the top cap 454 as described, the heat transfer cap 456 may be easily removed for cleaning and easily replaced after cleaning.

The first temperature probe 452 may be coupled to or in operative communication with a biasing member or spring 480, such that the first temperature probe 452 is urged upwardly, e.g., towards a utensil positioned on the grate 400, by the spring 480. For example, as illustrated in FIG. 10, the spring 480 may be coupled to a flange on the sensor body 472 such that the spring 480 biases the sensor body 472 with the first temperature probe 452 therein upwards towards the top surface 468 of the sensor finger 410. Thus, first temperature probe 452 may be positioned on sensor finger 410 such that first temperature probe 452 is configured to contact a cooking utensil, or be in conductive thermal communication with the cooking utensil via the top cap 454 and in some embodiments the heat transfer cap 456, such that the first temperature probe 452 is operable to measure and/or detect the temperature of the cooking utensil on the grate 400 when the cooking utensil is heated by the corresponding gas burner 110.

A base cap or cover 460 may also be mounted to the sensor finger 410 within the slot 414 or adjoining the slot 414 at the bottom surface 416 of sensor finger 410. Cover 460 may be positioned between the first temperature probe 452 and gas burner 110, e.g., along the vertical direction V. Thus, cover 460 may advantageously shield first temperature probe 452 from direct heating by gas burner 110, and the bottom insulator 476 may provide further insulation of the probe 452 from direct heating by the gas burner 110. For example, cover 460 and bottom insulator 476 may block direct radiative heat transfer from surfaces at gas burner 110 to the first temperature probe 452, and/or cover 460 and bottom insulator 476 may shield the first temperature probe 452 from direct convective heat transfer from gas burner 110.

A tubular sheath 462 is positioned within slot 414, and tubular sheath 462 may extend between probe 452 and a base 464 of the temperature sensor 450. Tubular sheath 462 may be a metal tubular sheath, such as an aluminum, copper, steel, or other suitable tube, such as a ceramic tube.

A wire 470 extends through tubular sheath 462 between the first temperature probe 452 and the base 464. The second temperature probe 453 may be positioned at an intermediate location along the wire 470 between the first temperature probe 452 and the base 464. The base 464 may be or include a pogo pin terminal block, e.g., the base 464 of the first temperature sensor 450 embedded in the first grate 400 may be or provide a third pogo pin terminal block, and the base 464 of the second temperature sensor 450 embedded in the second grate 402 may be or provide a fourth pogo pin terminal block, where the third and fourth pogo pin terminal blocks on the grates 400 and 402 may be connectable with the first pogo pin terminal block 150 and the second pogo pin terminal block 152 on the top panel 102. Wire 470 connects the first and second probes 452 and 453 with the pogo pin connectors on the base 464 to place the first and second probes 452 and 453 and base 464 in signal communication with each other. Thus, wire 470 may transmit electrical signals between probes 452 and/or 453 and base 464, such as a pogo pin terminal block and/or pogo pin connectors of the base 464. Wire 470 may include a woven fiberglass jacket or a woven steel mesh jacket. Such construction of wire 470 may advantageously limit conductive heat transfer between tubular sheath 462 and wire 470. Thus, wire 470 within tubular sheath 462 may be insulated for high temperatures.

The base 464 of the temperature sensor 450 may be positioned at or within the second end 420 of the slot 414. Thus, the temperature sensor 450 may extend within the slot 414 from the base 464 at the second end 420 of the slot 414 to the probe 452 in the first end portion 419 at the first end 418 of the slot 414, whereby the temperature sensor 450 may be embedded within the grate 400, e.g., within the slot 414 of the grate 400. As mentioned, the base 464 may include a pogo pin terminal block having pogo pin connectors, e.g., contact pads or spring-loaded pins. For example, the base 464 may include three contact pads 466 for connecting with spring-loaded pins 154 of the first pogo pin terminal block 150 or the spring-loaded pins 156 of the second pogo pin terminal block 152 when the grate 400 is mounted on the frame 200 and the frame 200 is mounted on the panel 102. In alternative example embodiments, the relative position of spring loaded pins and contact pads on first and second pogo pin terminal blocks 150, 152 and the base 464 of the temperature sensor 450 may be reversed.

Such construction of the sensor finger 410 and temperature sensor 450 provides numerous advantages. For example, temperature sensor 450 is advantageously positioned proximate a cooking utensil on the grate 400 yet temperature sensor 450 are also shielded by sensor finger 410 and tubular sheath 462 from direct convective heating from gas burner 110. As another example, providing pogo pin terminal blocks, e.g., the base 464 of the or each temperature sensor 450 having pogo pin connectors thereon, also allows grates 400 and 402 to be removed from the panel 102 without the need to manually disconnect any wiring. Such pogo pin connections may also accommodate variation in positioning of grates 400 and 402 on panel 102 while also maintaining good electrical signal. The foregoing advantages are described by way of example only and without limitation. Additional advantages of the present disclosure may also be apparent to those of ordinary skill in the art.

As mentioned above, the cooktop appliance 100 may include a controller 130 and the first and second grates 400 and 402 may include first and second sensor fingers 410 and 412, respectively, with each having a temperature sensor 450 embedded therein. The temperature sensor(s) 450 may be selectively in operative communication with the controller 130, e.g., may be in operative communication with the controller 130 via a connection between the first and second pogo pin terminal blocks 150 and 152 on the panel 102 and respective pogo pin connectors on each of the grates 400 and 402 when the grates 400 and 402 are mounted on the frame 200 while the frame 200 is mounted on the panel 102.

As may be seen in the enlarged views of FIGS. 14 through 17, the temperature sensor 450, and in particular the first temperature probe 452 thereof, may be thermally isolated from the grate 400, including the sensor finger 410. For example, such thermal isolation may be provided, at least in part by the thermally insulative sensor body 472. Additionally, such thermal isolation may be provided, at least in part, by the cover 460, e.g., as described above where the cover 460 faces the gas burner 110 and at least partially shields the first temperature probe 452 from direct convective heat transfer from air heated by gas burner 110. Further, such thermal isolation may also be provided at least in part by the bushing 474 and the bottom insulator 476.

The heat transfer cap 456 may advantageously provide an enlarged contact surface 486 for contacting the underside of a cooking utensil and thereby promoting heat transfer from the cooking utensil to the first temperature probe 452. The contact surface 486 on the heat transfer cap 456 may be enlarged with respect to the top cap 454. For example, the top cap 454 may define a first major dimension, e.g., diameter, and the heat transfer cap 456 may define a second major dimension, e.g., diameter, and the second diameter may be greater than the first diameter, e.g., as may be seen in FIGS. 14 through 18.

In some embodiments, the heat transfer cap 456 may be spaced apart from the grate 400, including the sensor finger 410 thereof, to prevent excessive heat transfer between the grate 400 and the sensor 450. For example, the heat transfer cap 456, in some embodiments, does not touch the grate 400. In some embodiments, the heat transfer cap 456 may be spaced apart from the grate 400 continuously around a circumference of the heat transfer cap 456, e.g., such that the entire perimeter, e.g., circumference, of the heat transfer cap 456 is not in contact with the sensor finger 410 (or any other part of the grate 400), as may be seen for example in FIGS. 10 and 18.

In some embodiments, e.g., as illustrated in FIGS. 10 and 18, the sensor finger 410 may include a raised shoulder 426. An inner diameter of the raised shoulder 426 may define the external joint or interface between the temperature sensor 450 and the sensor finger 410, in particular the external joint between the raised shoulder 426 and the bushing 474. Such external joint may be protected from spills in order to prevent or minimize material, e.g., spilled food, from entering into the sensor finger 410 and/or the temperature sensor 450 embedded therein at the external joint. For example, as illustrated in FIGS. 10 and 18, in some embodiments, the heat transfer cap 456 overhangs the raised shoulder 426. Such overhang may serve to prevent or minimize spilled material reaching the space within the interior of the sensor finger 410, e.g., the slot 414 wherein the temperature sensor 450 is disposed, such as by seeping through between the sensor finger 410 and the sensor bushing 474 and/or between the bushing 474 and the sensor body 472.

Figure 17:
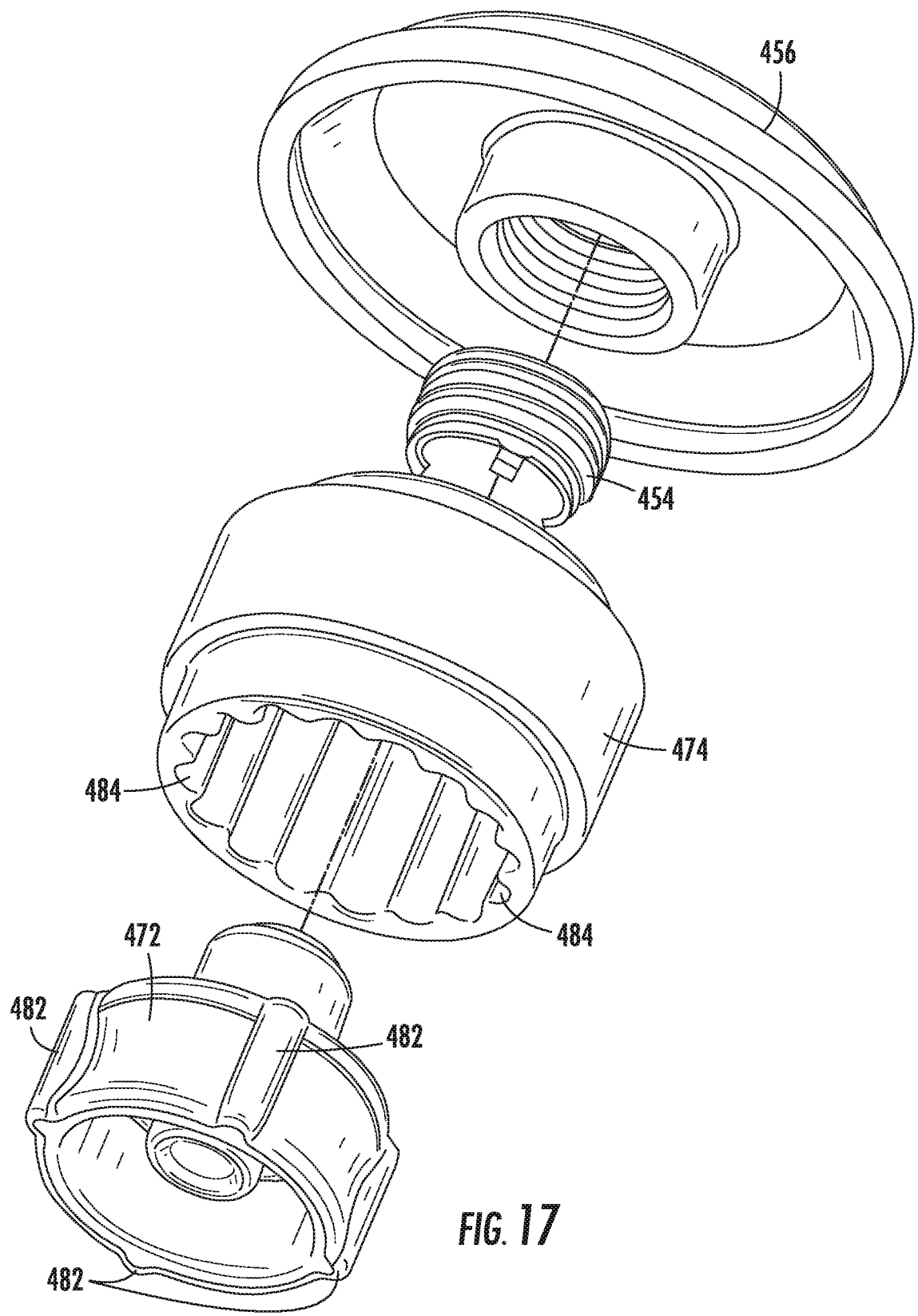
FIG. 17 provides an exploded view of some components of the temperature sensor of FIG. 12.

As noted in FIG. 17, the sensor body 472 may include a plurality of external ribs 482 and the bushing 474 may include a plurality of internal slots 484 which are configured, e.g., sized and shaped, to engage with the ribs 482 of the sensor body 472. Thus, the engagement of the ribs 482 in the slots 484 may prevent relative rotation of the sensor body 472 and the bushing 474, e.g., when screwing on the heat transfer cap 456.

As may be seen in FIG. 19, in some embodiments, the heat transfer cap 456 may define an outer dimension, such as an outer diameter, which is less than a corresponding outer dimension, e.g., outer diameter, of the sensor finger 410. For example, as illustrated in FIG. 19, the first end portion 419 of the sensor finger 410 may have a circular or cylindrical shape and the diameter of the first end portion 419 of the sensor finger 410 may be greater than the diameter of the heat transfer cap 456, whereby the first end portion 419 of the sensor finger 410 may at least partially block heat, e.g., direct convective heat, from the burner 110 from directly impacting the sensor 450, e.g., the heat transfer cap 456 thereof. Thus, in some embodiments, the first end portion 419 of the sensor finger 410 may define a first diameter and the heat transfer cap 456 may define a second diameter which is less than the first diameter.

The cooktop appliance 100 shown in the accompanying figures and described herein illustrates various example embodiments of the present disclosure. Thus, although described in the context of cooktop appliance 100, the present disclosure may be used in cooktop appliances having other configurations, e.g., a cooktop appliance with fewer burner assemblies or additional burner assemblies. Similarly, the present disclosure may be used in cooktop appliances that include an oven, i.e., range appliances. As another example, the present disclosure may be used with a cooktop appliance without a separate frame or frames, e.g., where the grate(s) may be positioned directly on the top panel, such as grates 400 and/or 402 may include vertical portions, such as legs, and may be positioned directly on panel 102. Additional other and further variations in the configuration of the cooktop appliance 100 as will be understood by those of ordinary skill in the art are also contemplated as being within the scope of the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas burner assembly, comprising:
   a gas burner;
   a grate with a plurality of fingers positioned above the gas burner, the plurality of fingers including a sensor finger, the sensor finger comprising a first end portion and the first end portion comprising a raised shoulder; and
   a temperature sensor mounted to the sensor finger of the plurality of fingers of the grate at the first end portion of the sensor finger, the temperature sensor comprising a heat transfer cap facing away from the gas burner and configured to contact a cooking utensil positioned on the grate;
   wherein the first end portion of the sensor finger defines a first diameter and the heat transfer cap defines a second diameter, wherein the second diameter is less than the first diameter, wherein the heat transfer cap overhangs the raised shoulder of the first end portion of the sensor finger, and wherein the temperature sensor is thermally isolated from the grate.

2. The gas burner assembly of claim 1, wherein the temperature sensor comprises a probe disposed within a thermally insulative sensor body.

3. The gas burner assembly of claim 1, wherein the temperature sensor comprises a probe and a thermally conductive top cap in contact with the probe.

4. The gas burner assembly of claim 1, wherein the heat transfer cap is spaced apart from the grate continuously around a circumference of the heat transfer cap.

5. The gas burner assembly of claim 1, wherein the temperature sensor comprises a thermally conductive top cap and the heat transfer cap is removably connected to the thermally conductive top cap whereby the heat transfer cap is removable from the sensor finger.

6. The gas burner assembly of claim 1, wherein the temperature sensor comprises a probe, the probe defines a first diameter and the heat transfer cap defines a second diameter, and wherein the second diameter is greater than the first diameter.

7. The gas burner assembly of claim 1, wherein the temperature sensor comprises a probe disposed within a thermally insulative sensor body and a thermally conductive top cap in contact with the probe, wherein the heat transfer cap is threadedly connected to the top cap, wherein the top cap defines a first diameter and the heat transfer cap defines a second diameter, and wherein the second diameter is greater than the first diameter.

8. The gas burner assembly of claim 1, wherein the temperature sensor further comprises a base comprising a pogo pin connector, wherein the base of the temperature sensor is positioned in an outer frame of the grate, and wherein the pogo pin connector is configured to contact a pogo pin terminal block on a top panel of a cooktop appliance.

9. The gas burner assembly of claim 1, wherein the temperature sensor further comprises a temperature probe and a biasing member in operative communication with the temperature probe whereby the biasing member urges the temperature probe upward towards a top surface of the sensor finger.

10. A cooktop appliance, comprising:
    a top panel
    a gas burner positioned on the top panel;
    a grate positioned on the top panel, the grate having a plurality of fingers positioned above the gas burner, the plurality of fingers including a sensor finger, the sensor finger comprising a first end portion and the first end portion comprising a raised shoulder; and
    a temperature sensor mounted to the sensor finger of the plurality of fingers of the grate at the first end portion of the sensor finger, the temperature sensor comprising a heat transfer cap facing away from the gas burner and configured to contact a cooking utensil positioned on the grate;
    wherein the first end portion of the sensor finger defines a first diameter and the heat transfer cap defines a second diameter, wherein the second diameter is less than the first diameter, wherein the heat transfer cap overhangs the raised shoulder of the first end portion of the sensor finger, and wherein the temperature sensor is thermally isolated from the grate.

11. The cooktop appliance of claim 10, wherein the temperature sensor comprises a probe disposed within a thermally insulative sensor body.

12. The cooktop appliance of claim 10, wherein the temperature sensor comprises a probe and a thermally conductive top cap in contact with the probe.

13. The cooktop appliance of claim 10, wherein the heat transfer cap is spaced apart from the grate continuously around a circumference of the heat transfer cap.

14. The cooktop appliance of claim 10, wherein the temperature sensor comprises a thermally conductive top cap and the heat transfer cap is threadedly connected to the thermally conductive top cap whereby the heat transfer cap is removable from the sensor finger.

15. The cooktop appliance of claim 10, wherein the temperature sensor comprises a probe, the probe defines a first diameter and the heat transfer cap defines a second diameter, and wherein the second diameter is greater than the first diameter.

16. The cooktop appliance of claim 10, wherein the temperature sensor comprises a probe disposed within a thermally insulative sensor body and a thermally conductive top cap in contact with the probe, wherein the heat transfer cap is removably mounted on the top cap, wherein the top cap defines a first diameter and the heat transfer cap defines a second diameter, and wherein the second diameter is greater than the first diameter.

17. The cooktop appliance of claim 10, wherein the temperature sensor further comprises a base comprising a pogo pin connector, wherein the base of the temperature sensor is positioned in an outer frame of the grate, and wherein the pogo pin connector is configured to contact a pogo pin terminal block on a top panel of the cooktop appliance.

18. The cooktop appliance of claim 10, wherein the temperature sensor further comprises a temperature probe and a biasing member in operative communication with the temperature probe whereby the biasing member urges the temperature probe upward towards a top surface of the sensor finger.

* * * * *